(12) United States Patent
Birkler et al.

(10) Patent No.: US 6,516,314 B1
(45) Date of Patent: Feb. 4, 2003

(54) OPTIMIZATION OF CHANGE LOG HANDLING

(75) Inventors: Jörgen Birkler, Bara (SE); Lars Novak, Bjärred (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 0 days.

(21) Appl. No.: 09/427,910

(22) Filed: Oct. 27, 1999

Related U.S. Application Data

(60) Provisional application No. 60/108,902, filed on Nov. 17, 1998, and provisional application No. 60/110,485, filed on Dec. 1, 1998.

(51) Int. Cl.[7] .............................................. G06F 17/30
(52) U.S. Cl. ............................ 707/8; 707/10; 707/201; 707/203; 707/204; 714/20
(58) Field of Search ....................... 707/10, 8, 200, 707/201, 204, 203, 202; 711/202, 162, 112, 161; 714/20, 15; 709/321, 229

(56) References Cited

U.S. PATENT DOCUMENTS

| | | | |
|---|---|---|---|
| 5,247,684 A | 9/1993 | Tavares et al. | 395/700 |
| 5,307,487 A | 4/1994 | Tavares et al. | 395/650 |
| 5,613,113 A | 3/1997 | Goldring | 395/618 |
| 5,666,514 A | 9/1997 | Cheritan | 711/144 |
| 5,706,509 A | 1/1998 | Man-Hak Tso | 395/617 |
| 5,737,600 A | 4/1998 | Geiner et al. | 395/616 |
| 5,832,508 A | 11/1998 | Sherman et al. | 707/200 |
| 6,393,419 B1 * | 5/2002 | Novak et al. | 707/10 |
| 6,401,104 B1 * | 6/2002 | LaRue et al. | 707/200 |

FOREIGN PATENT DOCUMENTS

| | | |
|---|---|---|
| WO | WO 97/41520 | 11/1997 |
| WO | PCT/SE 99/02004 | 6/2000 |

OTHER PUBLICATIONS

*Bounding Journal Back–Off during Recovery of Data Base Replica in Fault–Tolerant Clusters*; IBM Technical Disclosure Bulletin, vol. 36, No. 11, pp. 675–678; XP002138512.

\* cited by examiner

Primary Examiner—Jean M. Corrielus
(74) Attorney, Agent, or Firm—Jenkens & Gilchrist, A Professional Corporation

(57) ABSTRACT

An information synchronization method and apparatus stores a change log having an associated change counter at a first database, updates the change counter at the first database in response to a database update command from a second database, and returns the updated change counter to the second database in response to a processing condition resulting from the database update command at the first database. The information synchronization protocol ensures that the second database maintains the most current change counter for use in a subsequent synchronization procedure and in the event that an interruption or error occurs, thereby increasing the efficiency of information synchronization by enabling the second database to process only those changes of the first database occurring after the updated change counter.

20 Claims, 5 Drawing Sheets

OPTIMIZATION OF CHANGE LOG HANDLING

CROSS-REFERENCES TO RELATED APPLICATIONS

This Application for Patent claims the benefit of priority from, and hereby incorporates by reference the entire disclosure of, co-pending U.S. Provisional Applications for Patent Serial Nos. 60/108,902, filed Nov. 17, 1998, and 60/110,485, filed Dec. 1, 1998. This Application for Patent is also related by subject matter to co-pending U.S. Non-provisional Application for Pat. Ser. No. 09/427,909, filed on Oct. 27, 1999.

BACKGROUND OF THE INVENTION

1. Technical Field of the Invention

The present invention relates in general to the field of communications, and in particular, to optimizing synchronization procedures which utilize a change log to thereby increase efficiency of information synchronization between associated devices.

2. Description of Related Art

Handheld organizers, such as personal digital assistants, have become increasingly popular in our modern, information-rich society. These small, portable devices enable users to conveniently store and maintain such information as contacts, phone books, calendars, task lists, etc. and allow users to synchronize the stored information with a similar handheld organizer or with another computing device which emulates the appropriate hardware or software protocols. The synchronization process allows users to add, modify or delete information at a first device and synchronize the added, modified or deleted information with a second device so that both devices contain the same information. With the recent incorporation of handheld organizers, or at least features thereof, into wireless communication devices, such as mobile phones and pagers, and the addition of wireless interfaces to conventional handheld organizers, the synchronization process has become easier and more convenient by allowing users to synchronize information stored at associated devices via a wireless interface.

The convenience and, efficiency of information synchronization has been further enhanced through the use of change log handling. A change log is typically a register or group of records which store a log of changes made to one of the associated databases. For example, a change log associated with a first database stores and maintains information associated with changes made to records of the first database. During a synchronization procedure, the change log is utilized by a synchronization apparatus to process only those changes that are contained in the change log. Consequently, the change log significantly increases the efficiency of information synchronization by avoiding the necessity of comparing each record contained in the first database with each corresponding record contained in a second database in order to maintain a one-to-one relationship between the two databases.

One significant problem associated with this approach is that the change log is stored and maintained only at the first database which forces the synchronization apparatus to request a transfer of the entire change log in response to initiation of a synchronization procedure. Because the synchronization apparatus must process changes at the second database in the same order in which the changes were made to the first database, the synchronization apparatus must read the entire change log to identify the oldest entries of the change log (e.g., the oldest changes of the first database). This procedure can be time-consuming depending on the size of the change log.

Another significant problem is that existing approaches do not define how the change log should be optimally transferred to the synchronization apparatus, the order in which the change log should be optimally processed by the synchronization apparatus, and how the synchronization apparatus should proceed when an interruption occurs during the transfer of the change log. For example, a typical transfer begins with the first byte of the change log, and ends with the last byte of the change log. If an interruption occurs during the transfer, the synchronization apparatus will not receive the oldest entries of the change log, and it therefore cannot begin processing the entries of the change log at the second database. Consequently, an interruption in the transfer of the change log forces the synchronization apparatus to request re-transmission of the entire change log after a connection to the first database is restored. This procedure further decreases the efficiency of information synchronization.

Therefore, in light of the deficiencies of existing approaches, there is a need for a method and apparatus that optimizes synchronization procedures which utilize a change log to thereby increase the efficiency of information synchronization.

SUMMARY OF THE INVENTION

The deficiencies of the prior art are overcome by the method and system of the present invention. For example, as heretofore unrecognized, it would be beneficial to optimize information synchronization between a first device and a second device by increasing the efficiency of change log handling. For example, in accordance with one aspect of the present invention, the second device stores a change counter value associated with a last synchronized entry of a change log stored at the first device. A portion of the change log containing entries occurring after a submitted change counter value is preferably transferred from the first device to the second device in a predetermined order so as to avoid restarting the synchronization procedure in the event an interruption in the transfer of the change log occurs. Also, the change counter value stored at the second device is preferably updated after each entry of the transferred change log is processed at the second device and in response to database updates performed at the first device.

In a first embodiment, a current change counter is stored at a first device, and is updated at the first device in response to a database update command from a second device. The first device then returns the updated change counter to the second device in response to a processing condition resulting from the database update command at the first device. The updated change counter can be included in, for example, a confirmation message to the second device. The confirmation message can inform the second device of the current change counter, the unique identification (UID) of the record at the first device and a status of the database update command. The second device may then store the returned change counter for use in a subsequent synchronization procedure or in the event an interruption or other error occurs, without having to read the entire change log.

In a second embodiment, the second device submits a stored change counter to the first device in response to initiation of a synchronization procedure, and the first device transfers to the second device entries of the change log occurring after the submitted change counter. The entries of the change log are preferably transferred to the second device in reverse order (e.g., with the oldest entries of the change log first). The second device also preferably processes the oldest entries of the change log first, and updates the change counter stored at the second device after each entry is processed. As a result, the second device can avoid restarting the synchronization procedure in the event an interruption occurs, and can start performing updates in accordance with the received entries of the change log, even though only a portion of the transferred change log is actually received.

The technical advantages of the present invention include, but are not limited to, the following exemplary technical advantages. It should be understood that particular embodiments may not involve any, much less all, of the following exemplary technical advantages.

An important technical advantage of the present invention is that it increases the efficiency of change log handling by ensuring that the second device maintains the current change counter.

Another important technical advantage of the present invention is that it enables the second device to process change log entries despite an interruption in the transfer of the change log.

Yet another important technical advantage of the present invention is that it allows the second device to begin processing the change log even when only a portion of the change log is actually received.

Yet still another important technical advantage of the present invention is the ability to improve the efficiency of synchronization procedures which utilize a change log by optimizing change log handling.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1–3D of the drawings, like numerals being used for like and corresponding parts of the various drawings. It should be emphasized that although the following description describes certain aspects of the present invention in the context of information synchronization between associated wireless devices via a wireless interface, the present invention is not limited to such devices or interfaces. Rather, the principles of the present invention are equally applicable to information synchronization between other types of devices via, for example, electrical or electro-mechanical connectors. Therefore, the following description is provided for purposes of explanation, and not limitation.

Figure 1:
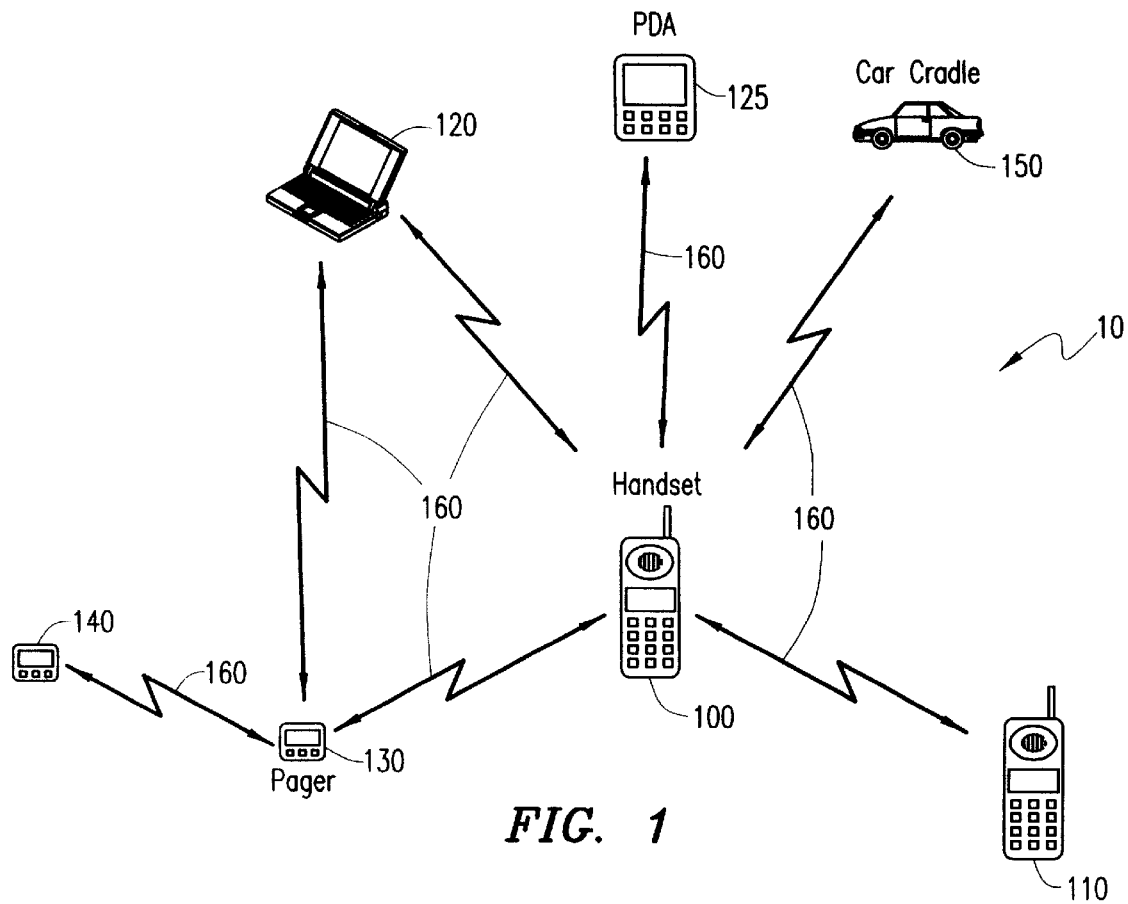
FIG. 1 illustrates an exemplary block diagram of a wireless system which synchronizes information stored at a first device with information stored at a plurality of associated devices.

Referring to FIG. 1, an exemplary block diagram of a wireless system which synchronizes information stored at a first device with information stored at a plurality of associated devices is illustrated generally at 10. The exemplary wireless system includes a first device, such as a wireless handset 100, which is capable of communicating with one or more associated devices, such as another wireless handset 110, a personal computer (PC) 120, a personal digital assistant (PDA) 125, a pager 130, and a car cradle 150. Each of the associated devices 110, 120, 125, 130, and 150 may also communicate with one or more devices in addition to the first device 100. For example, the personal computer 120 may communicate with the pager 120, and the pager 120 may further communicate with another pager 140. The devices depicted in FIG. 1 preferably communicate with one another over a wireless interface 160 using, for example, infrared transceivers or short range radio transceivers.

Each device 100, 110, 120, 125, 130, 140 and 150 further includes a corresponding database (not shown in FIG. 1) which stores information, such as phone books, calendars, tasks lists, etc. By synchronizing the separate databases using an appropriate synchronization protocol, information stored at each device may be synchronized so that each device contains the same information (e.g., changes made to entries or records in one database are also made to the other databases).

Figure 2:
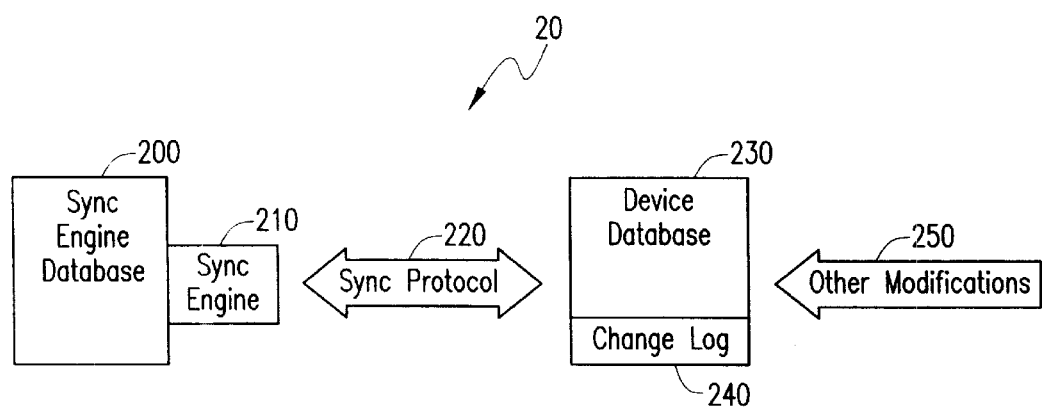
FIG. 2 illustrates an exemplary functional block diagram of a synchronization apparatus that can be used for synchronizing separate databases.

Referring to FIG. 2, an exemplary functional block diagram of a synchronization apparatus that can be used for synchronizing separate databases is depicted generally at 20. This exemplary apparatus includes a synchronization (sync) engine 210 connected to and associated with a particular (sync engine) database 200. For example, the sync engine database 200 can be a database associated with, or included as part of, the wireless handset 100 shown in FIG. 1. In this context, a "sync engine" is preferably the software that performs the database synchronization function. However, an apparatus that performs sync engine functions can also be considered as part of the sync engine 210. A second device database 230 is to be synchronized with the sync engine database 200. For example, the device database 230 can be associated with, or included as part of, the PDA 125. Notably, the synchronization procedure can be performed in either direction. For example, the PDA 125 can also include a sync engine 210, thereby allowing a device database 230 associated with the wireless handset 100 to be synchronized with a sync engine database 200 associated with the PDA 125.

A synchronization protocol 220 is used to define the database synchronization procedure. A change log 240 is preferably associated with the device database 230, and is preferably a log or register in which changes made to the device database 230 are temporarily stored. For example, the size of the change log 240 can be fixed, and older changes can be pushed out of the change log 240 as new changes are added. As such, each entry in the change log 240 is associated with a certain act performed on the device database 230 (e.g., add, delete, or modify), a time stamp (or change counter value) and a Unique Identifier (UID). A UID is a number assigned to each new entry in a database. These UID numbers are unique in that they are not reused within the same database. Preferably, the change counter is stored in the change log 240 for each change that occurs, and also stored in the sync engine 210 after a synchronization procedure is performed.

In synchronizing information between the sync engine database 200 and the device database 230, the sync protocol 220 typically performs either a "slow" synchronization or a "fast" synchronization. If at least one of the two databases 200, 230 contains information when the first synchronization attempt is made, a slow synchronization procedure is performed. Slow synchronization is a procedure whereby all of the entries in one of the databases are compared with all of the entries in the associated database. Individual entries are then added, modified or deleted in order to maintain a one-to-one relationship between the two databases 200, 230. When such a slow synchronization procedure is performed, a UID resolution table is created (e.g., by the sync engine software) The entries in such a UID resolution table reflect the relationship between the entries of the two databases that have been synchronized. For example, if there is a UID for an entry in the device database 230, the UID resolution table provides the UID for the entry in the device database 230 and the UID of that same entry in the sync engine database 200. In contrast, a fast synchronization procedure is performed if the change log 240 contains all database changes since the last synchronization was performed (e.g., no entries in the change log 240 have been pushed out). When such a fast synchronization procedure is performed, only those unsynchronized changes in the affected database have to be compared and transferred between the device database 230 and the sync engine 210. Accordingly, fast synchronization is significantly faster than slow synchronization.

One significant problem associated with the synchronization apparatus 20 is that the sync engine 210 may not know the value of the current change counter, because both the change counter and the UID associated with the database record are created in the device database 230, not the sync engine 210. For example, when the sync engine 210 performs database updates on the device database 230, the sync engine 210 will not know the value of the current change counter. One technique that may be used is to return the UID of each new entry after the entry is added to the device database 230 as a confirmation that the new entry was received and processed at the device database 230. The change counter, however, is not returned. The disadvantage with this technique is that the sync engine 210 must read the whole change log 240 after a complete synchronization is performed in order to determine the current change counter. This process can be time consuming depending on the size of the change log 240.

Another problem arises when the transfer of the change log 240 from the device database 230 to the sync engine 210 is interrupted. For example, a typical transfer may start from the beginning of the change log 240 and end with the last byte of the change log 240. As a result, if an interruption occurs during the transfer, the sync engine 210 would not receive the last entry in the change log, and therefore, not the oldest entry of the change log. Consequently, the sync engine 210 cannot start processing the change log 240, or request database records, until the sync engine 210 has completely reread the change log 240 after a connection is restored. This increases the inefficiency of change log handling.

Referring to FIGS. 3A, 3B, 3C and 3D, an exemplary method in flow chart form by which the principles of the present invention may be advantageously practiced is illustrated generally at 30. It should be noted that the exemplary method described herein can be implemented by, for example, the exemplary synchronization apparatus depicted in FIG. 2 and/or the exemplary system depicted in FIG. 1. For the purpose of illustration, and not limitation, the following description describes the exemplary method in the context of database synchronization between a sync engine database 200 and a device database 230. These databases 200, 230 can be contained in, or associated with, one or more of the devices depicted in FIG. 1. The exemplary method, however, is not limited to these specific devices. Rather, persons of reasonable skill will recognize that this exemplary method is equally applicable to other implementations that depart from the specific details described herein. It should be further emphasized that the method can be performed in either direction (e.g., the device database 230 can include a sync engine 210 which can be used to synchronize information between the device database 230 and the sync engine database 200 in accordance with a change log 240 associated with the sync engine database 200).

Figure 3A:
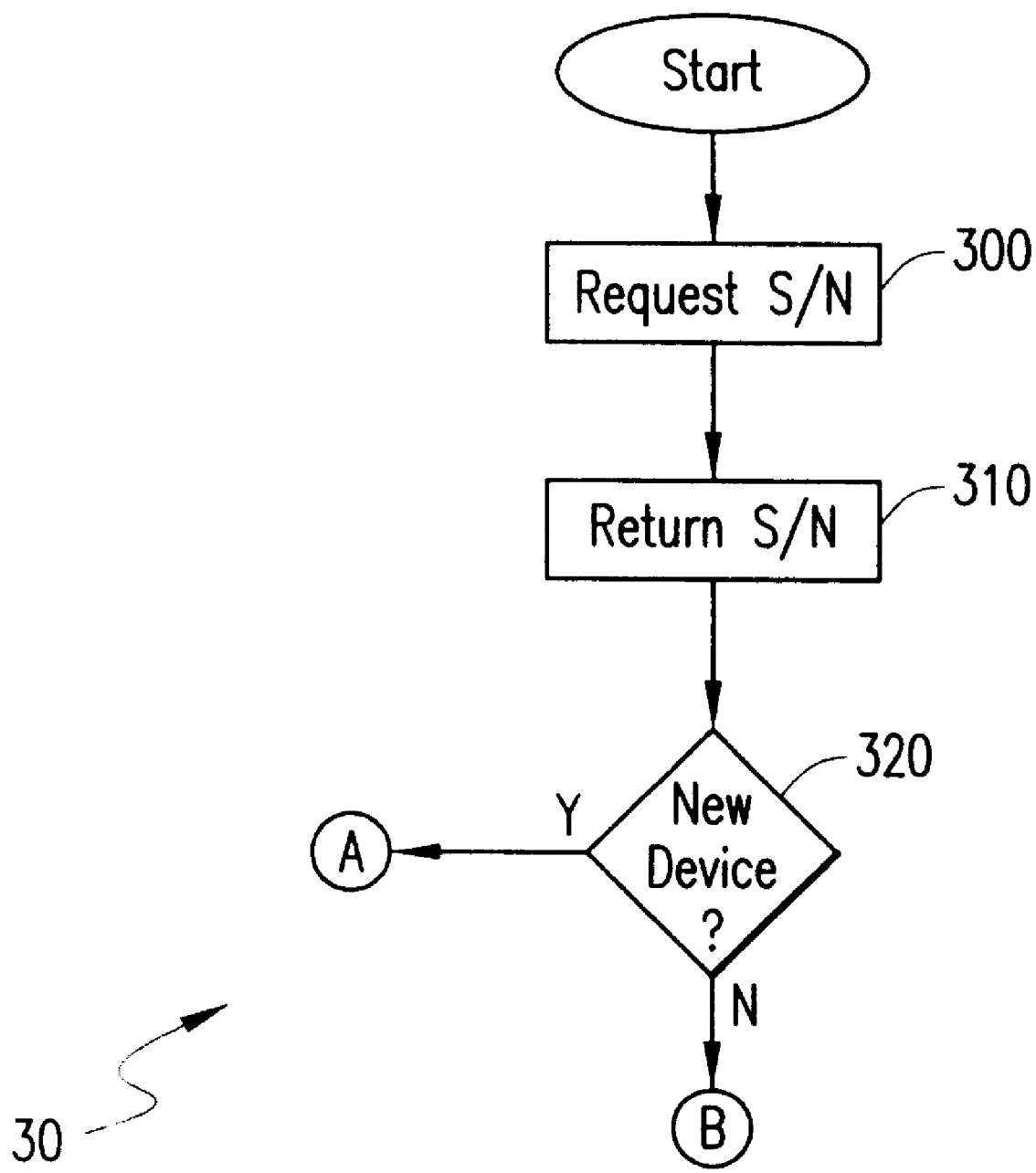
FIGS. 3A, 3B, 3C and 3D illustrate an exemplary method in flow chart form by which the principles of the present invention may be advantageously practiced.

Referring to FIG. 3A, the exemplary method begins at step 300 with the sync engine 210 requesting a serial number from a device database 230 in communication therewith. This request can be initiated by, for example, receipt of a paging signal or an acknowledgment signal from the device database 230. In response to the serial number request, the device database 230 returns its associated serial number to the sync engine 210 at step 310. This associated serial number preferably uniquely identifies the device database 230, and can include, for example, a Bluetooth ID or an identification associated with another communications protocol. The sync engine 210 then compares the received serial number to a stored list of known devices at step 320 to determine whether the device is a new device, thereby indicating that a first synchronization is requested.

Figure 3B:
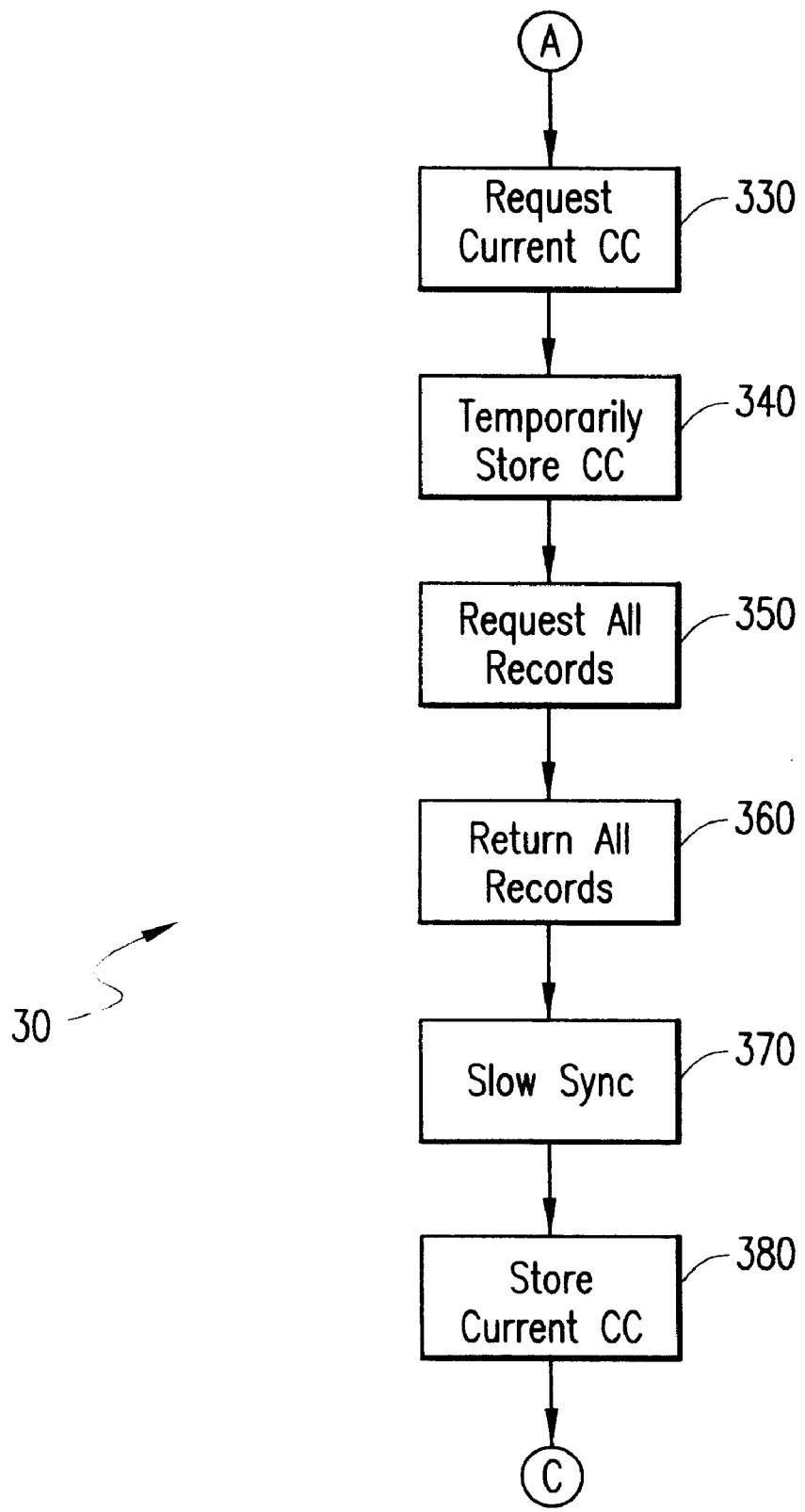

If sync engine 210 determines that the device is a new device (e.g., that a first synchronization is requested), the process proceeds to step A where a slow synchronization is performed. Referring to FIG. 3B, the sync engine 210 performs the slow synchronization procedure by first requesting the current change counter (CC) from the device database 230 at step 330. In response to this request, the device database 230 returns the current change counter, and the sync engine 210 temporarily stores the returned change counter value at step 340. The sync engine 210 then requests all database records of the device database 230 at step 350, and the device database 230 returns all its records to the sync engine 210 at step 360. The sync engine 210 then performs a slow synchronization procedure at step 370 by comparing all records received from the device database 230 with records stored at the sync engine database 200. This step of comparing is performed on a field-by-field basis so that a one-to-one relationship between the device database 230 and the sync engine database 200 is maintained. After the slow synchronization procedure is completed, the sync engine 210 stores the current change counter at step 380 which is then utilized in subsequent synchronization procedures as will be described in greater detail below.

Figure 3C:
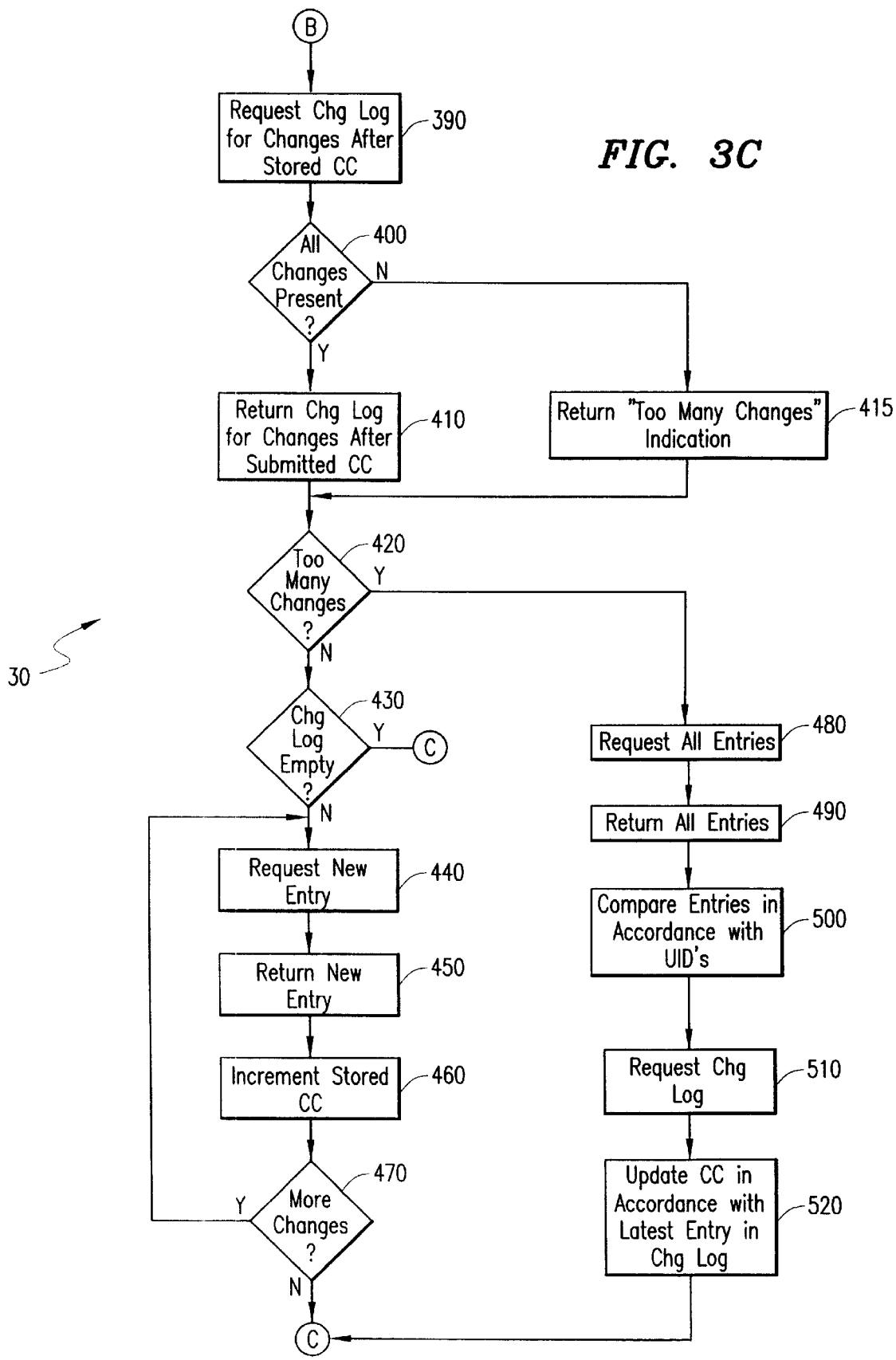

Referring back to step 320 of FIG. 3A, if the sync engine 210 determines that the device is not a new device (e.g., that a first synchronization has already occurred), the process proceeds to step B where the sync engine 210 initiates a fast synchronization procedure as illustrated in FIG. 3C. In this fast synchronization procedure, the sync engine 210 submits its stored change counter to the device database 230 and requests from the device database 230 at step 390 the entries of the change log 240 that occurred after the submitted change counter. If the device database 230 determines at step 400 that all unsynchronized changes are present in the change log 240 (e.g., none of the entries in the change log 240 that occurred after the submitted change counter have been pushed out), the device database 230 returns at step 410 the entries of the change log 240 that occurred after the submitted change counter. Preferably, the device database 230 returns the entries in reverse order (e.g, with the oldest entries first) so that if an interruption occurs during transmission of the entries of the change log 240, the sync engine 210 may begin processing the change log 240 for at least the entries that are received. otherwise, an interruption in transmission would force the sync engine 210 to reread the change log 240 when a connection is reestablished in order to receive the oldest unsynchronized entry of the change log 240.

Figure 3D:
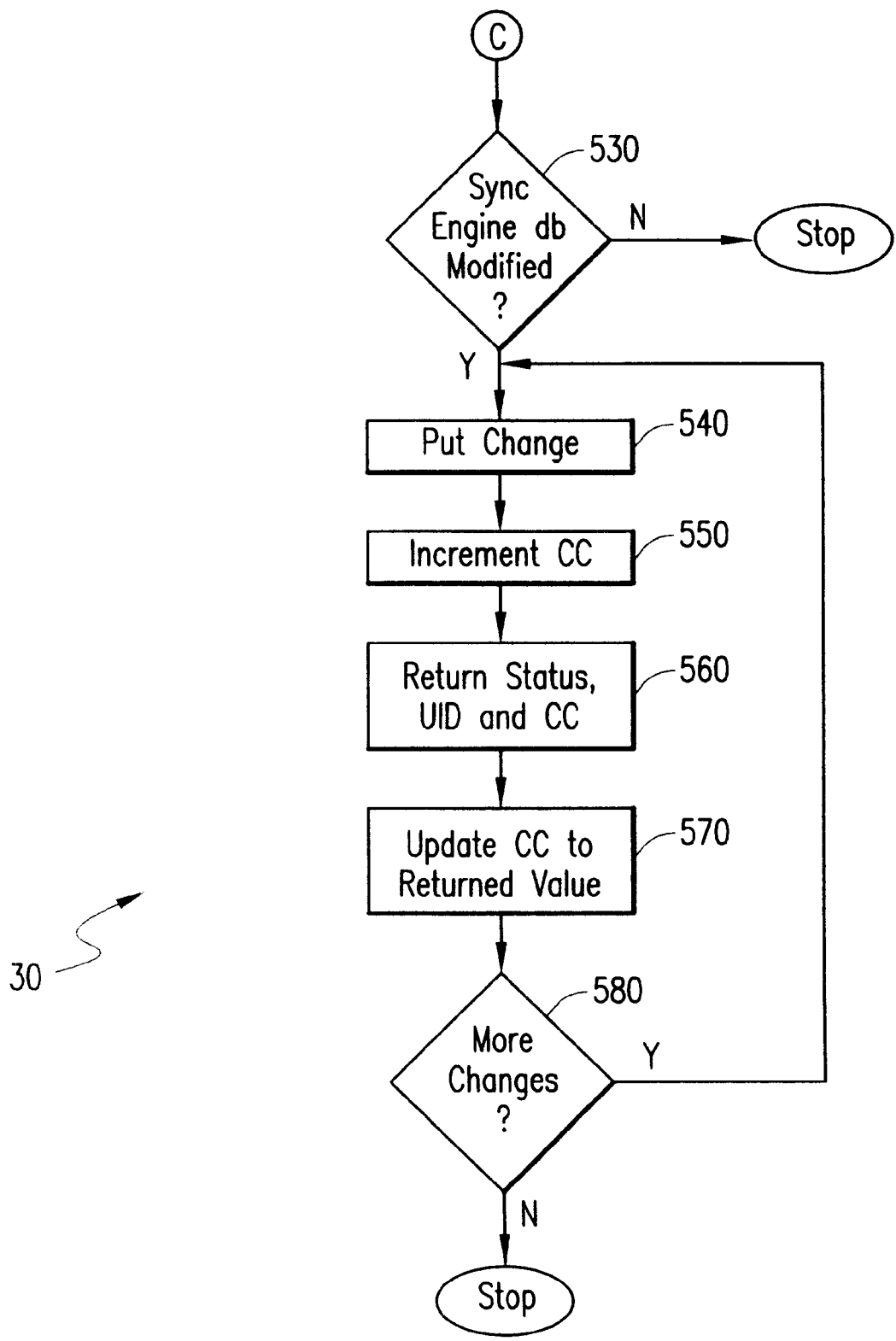

At step 400, if the device database 230 determines that not all unsynchronized changes are present in the change log 240 (e.g., some of the entries in the change log 240 occurring after the submitted change counter have been pushed out), the device database 230 returns a "too many changes" indication, such as an "★", to the sync engine 210 at step 415. This "too many changes" indication notifies the sync engine 210 that a fast synchronization procedure is not possible, and that an alternative procedure must be performed. Accordingly, the sync engine 210 inspects the returned change log at step 420 to determine whether all the entries are present. If so, then the sync engine 210 determines at step 430 whether the returned change log is empty (e.g., no changes were made to the device database 230 since the last synchronization). If the returned change log is empty, the process proceeds to step C as illustrated in FIG. 3D. Otherwise, the sync engine 210 requests database records from the device database 230 in accordance with the entries contained in the returned change log at step 440. The device database 230 returns the requested records at step 450. The sync engine 210 performs a database update to the sync engine database 200 in accordance with each returned entry of the change log and each returned record, and increments the stored change counter at step 460 after each entry of the returned change log is processed. The sync engine 210 repeats steps 440–460 for each entry contained in the returned change log, until the sync engine 210 determines that all the changes are processed at step 470. The process then proceeds to step C as illustrated in FIG. 3D.

It should be noted that in a preferred embodiment of the present invention the sync engine 210 processes the returned change log in reverse order (e.g., with the oldest entries of the change log first) and updates or increments the change counter stored at the sync engine 210 after each entry of the returned change log is processed. This enables the sync engine 210 to keep track of the current change counter so that if there is an interruption in transmission of the change log 240 or if some other error occurs, the sync engine 210 can begin processing the change log in accordance with the last updated change counter value. Consequently, the sync engine 210 can avoid restarting the synchronization process from the beginning. Furthermore, if the device database 230 transfers the entries of the change log 240 with the oldest entries first at step 410, the sync engine will always receive a valid portion of the information and may advantageously begin processing the returned entries, even though the transfer is interrupted and only a portion of the entries is received.

Referring back to step 420 of FIG. 3C, if the sync engine 210 determines that "too many changes" occurred, the sync engine 210 performs a "semi-slow" synchronization procedure. This procedure begins with the sync engine 210 requesting all database records from the device database 230 at step 480. The device database 230 then returns all of its database records (preferably oldest records first) to the sync engine 210 at step 490. At step 500, the sync engine 210 compares the UID's of the returned records with the UID resolution table stored at the sync engine 210 in order to process any differences between the device database 230 and the sync engine database 200. This process is significantly more efficient than performing a slow synchronization procedure. The sync engine 210 then requests the change log 240 from the device database at step 510, and updates the change counter stored at the sync engine 210 at step 520 in accordance with the most current entry of the returned change log 240. The process then proceeds to step C as illustrated in FIG. 3D.

At step C, changes made to the sync engine database 200, if any, are synchronized with the device database 230. Accordingly, the sync engine 210 determines at step 530 whether any changes were made to the sync engine database 200. If not, the procedure is complete, and the synchronization procedure terminates. If changes were made, the sync engine 210 "puts" changes to the device database 230 at step 540. This step involves the sync engine 210 issuing a database update command (e.g., a "put" command) to the device database 230 telling the device database 230 to make certain changes to its database records, such as adding a new record. Upon successful completion of the database update command, the device database 230 updates the change log 240 by adding at step 550 the associated database action (e.g., add, modify, delete), the UID of the associated database record and the updated (or incremented) change counter. At step 560, the device database 230 returns a confirmation message which includes, for example, the status of the database update command (e.g., ok or error), the UID of the associated database record, and the updated value of the change counter. The sync engine 210 at step 570 then updates its stored change counter in accordance with the returned change counter. It should be noted that the device database 230 preferably returns the current change counter, regardless of whether or not the database update command is successfully processed or not. The returned change counter enables the sync engine 210 to maintain the most current change counter for use in a subsequent synchronization procedure or in the event an error occurs during the processing of the change log. The sync engine 210 repeats steps 540–570 for each change of the sync engine database 200 as indicated by the affirmative/yes/positive branch of the decision step 580. Once all changes are processed, the synchronization procedure is complete, and the process terminates.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for optimizing change log handling, the method comprising the steps of:

storing a change counter at a first device;

updating the change counter at the first device in response to a database update command from a second device;

returning the updated change counter to the second device in response to a processing condition resulting from the database update command at the first device;

updating a second change counter stored at the second device in accordance with the returned updated change counter from the first device;

the second device submitting the second change counter to the first device in response to initiation of a synchronization procedure; and the first device transferring to the second device entries of a change log occurring after the submitted second change counter, the entries of the change log transferred to the second device with oldest entries first.

2. The method for optimizing change log handling of claim 1, wherein the step of returning comprises returning the updated change counter in a confirmation message to the second device.

3. The method for optimizing change log handling of claim 2, wherein the confirmation message further includes a Unique Identifier (UID) of a database record of the first device and a status of the database update command.

4. The method for optimizing change log handling of claim 1, wherein the processing condition comprises at least one of successful completion of the database update command and termination of the database update command.

5. The method for optimizing change log handling of claim 1, further comprising the steps of:

the second device processing the transferred entries of the change log with the oldest entries first; and the second device updating the second change counter after each entry of the transferred change log is processed.

6. The method for optimizing change log handling of claim 5, further comprising the steps of:

the second device resubmitting the second change counter to the first device if there is an interruption in transfer of the entries of the change log; and the first device transferring the entries of the change log occurring after the resubmitted second change counter.

7. The method for optimizing change log handling of claim 1, wherein the first device comprises a device database and the second device comprises a software synchronization engine.

8. The method for optimizing change log handling of claim 1, wherein the first device comprises at least one of a wireless handset, a computer, a personal digital assistant (PDA), a pager and a car cradle.

9. The method for optimizing change log handling of claim 1, wherein the second device comprises at least one of a wireless handset, a computer, a personal digital assistant (PDA), a pager and a car cradle.

10. A method for increasing efficiency of information synchronization between a first device and a second device, the method comprising the steps of:

storing a first change counter at the first device;

updating the first change counter at the first device in response to a database update command from the second device;

returning the updated first change counter to the second device in response to a processing condition resulting from the database update command at the first device;

updating a second change counter stored at the second device in accordance with the returned updated first change counter;

the second device submitting the updated second change counter to the first device in response to initiation of a synchronization procedure;

the first device transferring a portion of a change log to the second device, the portion of the change log containing a log of changes to a database associated with the first device occurring after the submitted second change counter, the portion of the change log transferred to the second device with the oldest entries first;

the second device processing the portion of the change log with oldest entries first; and the second device updating the stored second change counter after each entry of the portion of the change log is processed.

11. The method for increasing efficiency of synchronization of information between a first device and a second device of claim 10, wherein the step of returning comprises returning the updated first change counter in a confirmation message to the second device.

12. The method for increasing efficiency of synchronization of information between a first device and a second device of claim 11, wherein the confirmation message further includes a Unique Identifier (UID) associated with a database record and a status of the database update command.

13. The method for increasing efficiency of synchronization of information between a first device and a second device of claim 10, further comprising the steps of:

the second device resubmitting the second change counter to the first device if there is an interruption in transfer of the portion of the change log; and the first device transferring the portion of the change log occurring after the resubmitted second change counter.

14. The method for optimizing change log handling of claim 10, wherein the second device comprises a software synchronization engine.

15. A system for optimizing information synchronization between a first device and a second device, the system comprising:

a first database having a change log associated therewith, the change log including a change counter associated with each change performed on the first database;

a second database associated with the first database; and a synchronization engine associated with the second database adapted to synchronize information between the first database and the second database, the synchronization engine adapted to issue a database update command to the first database to account for changes to the second database, the synchronization engine receiving an updated change counter from the first database in response to a processing condition resulting from the database update command at the first database, wherein the synchronization engine updates a second change counter stored at the synchronization engine in accordance with the received updated change counter from the first database, wherein the synchronization engine submits the second change counter to the first database in response to initiation of a synchronization procedure, and wherein the first database transfers to the synchronization engine entries of the change log occurring after the submitted second change counter, the entries of the change log transferred to the syncronization engine with the oldest entries first.

16. The system for optimizing information synchronization between a first device and a second device of claim 15, wherein the updated change counter is received in a confirmation message from the first database.

17. The system for optimizing information synchronization between a first device and a second device of claim 16, wherein the confirmation message further includes a Unique Identifier (UID) of a record of the first database and a status of the database update command.

18. The system for optimizing information synchronization between a first device and a second device of claim 15, wherein the processing condition comprises at least one of successful completion of the database update command and termination of the database update command.

19. The system for optimizing information synchronization between a first device and a second device of claim 17, wherein the synchronization engine processes the transferred entries of the change log with the oldest entries first, and wherein the synchronization engine updates the second change counter after each entry is processed.

20. The system for optimizing information synchronization between a first device and a second device of claim 15, wherein the synchronization engine comprise a software module adapted to perform database synchronization functions.

* * * * *

UNITED STATES PATENT AND TRADEMARK OFFICE
CERTIFICATE OF CORRECTION

PATENT NO. : 6,516,314 B1
DATED : February 4, 2003
INVENTOR(S) : Jorgen Birkler et al.

It is certified that error appears in the above-identified patent and that said Letters Patent is hereby corrected as shown below:

Column 1,
Line 45, replace "The convenience and, efficiency" with -- The convenience and efficiency --

Column 7,
Line 24, replace "received.otherwise," with -- received. Otherwise, --
Line 34, replace "such as an "★", to" with -- such as an "*", to --

Signed and Sealed this

Sixth Day of May, 2003

JAMES E. ROGAN
*Director of the United States Patent and Trademark Office*